United States Patent
Krishna et al.

(10) Patent No.: US 10,776,229 B2
(45) Date of Patent: Sep. 15, 2020

(54) DEDICATED FALLBACK PROCESSING FOR A DISTRIBUTED DATA WAREHOUSE

(71) Applicant: Teradata US, Inc., Dayton, OH (US)

(72) Inventors: Tirunagari Venkata Rama Krishna, Telangana (IN); Srinath Boppudi, Telangana (IN); Frederick Stuart Kaufmann, Irvine, CA (US); Donald Raymond Pederson, San Diego, CA (US)

(73) Assignee: Teradata US, Inc., San Diego, CA (US)

( * ) Notice: Subject to any disclaimer, the term of this patent is extended or adjusted under 35 U.S.C. 154(b) by 234 days.

(21) Appl. No.: 15/852,654

(22) Filed: Dec. 22, 2017

(65) Prior Publication Data
US 2019/0196923 A1   Jun. 27, 2019

(51) Int. Cl.
*G06F 11/20* (2006.01)
*G06F 9/50* (2006.01)
*G06F 11/16* (2006.01)

(52) U.S. Cl.
CPC ........ *G06F 11/2097* (2013.01); *G06F 9/5083* (2013.01); *G06F 11/1658* (2013.01); *G06F 11/2048* (2013.01); *G06F 2201/80* (2013.01); *G06F 2201/82* (2013.01)

(58) Field of Classification Search
CPC ...... G06F 11/20; G06F 11/2097; G06F 11/16; G06F 11/1658

USPC .......................................................... 714/13
See application file for complete search history.

(56) References Cited

U.S. PATENT DOCUMENTS

| | | | | |
|---|---|---|---|---|
| 5,864,842 A * | 1/1999 | Pederson | .......... | G06F 16/24537 |
| 8,069,366 B1 * | 11/2011 | Wenzel | ................. | H04L 41/069 |
| | | | | 711/147 |
| 8,326,990 B1 * | 12/2012 | Li | .......... | G06F 9/5083 |
| | | | | 709/215 |
| 8,429,165 B1 * | 4/2013 | Jung | ................. | G06F 16/958 |
| | | | | 707/737 |
| 8,560,884 B2 * | 10/2013 | Gupta | ................. | G06F 11/1438 |
| | | | | 714/4.11 |
| 2002/0166031 A1 * | 11/2002 | Chen | ................... | G06F 12/0813 |
| | | | | 711/141 |
| 2005/0108593 A1 * | 5/2005 | Purushothaman | .. | G06F 11/2028 |
| | | | | 714/4.11 |
| 2005/0187977 A1 * | 8/2005 | Frost | ................. | G06F 16/278 |
| 2006/0015773 A1 * | 1/2006 | Singh | ................. | G06F 11/2028 |
| | | | | 714/13 |
| 2009/0063501 A1 * | 3/2009 | Buckler | ............. | G06F 11/2025 |
| 2014/0149784 A1 * | 5/2014 | Ngo | ................... | H04L 67/1008 |
| | | | | 714/4.11 |
| 2017/0220430 A1 * | 8/2017 | Joshi | ................... | G06F 11/2033 |
| 2017/0220431 A1 | 8/2017 | Joshi et al. | | |
| 2017/0220432 A1 * | 8/2017 | Misra | ................. | G06F 11/2092 |

\* cited by examiner

*Primary Examiner* — Kamini B Patel
(74) *Attorney, Agent, or Firm* — Schwegman, Lundberg & Woessner, P.A.; James Stover

(57) ABSTRACT

Database processing engines of a single cluster are configured such that each engine is a primary engine and a dedicated fallback engine to one other engine of the cluster. In an embodiment, the cluster includes more than two processing engines.

20 Claims, 6 Drawing Sheets

DEDICATED FALLBACK PROCESSING FOR A DISTRIBUTED DATA WAREHOUSE

BACKGROUND

A distributed data warehouse includes a plurality of distributed database engines. The engines process database instructions against tables for which the engines are assigned to satisfy queries and/or reports. The engines are often clustered together on one or more network nodes (processing devices). When an engine fails (for whatever reason), the tables, or portions of the tables, assigned to the failing engine has to be picked up by another one of the engines.

The engines are clustered together in clusters of engines. Currently, tables associated with that engine are spread out (balanced out) over remaining engines in that cluster. So, when one engine is down, the failover processing ensures that the tables for the failing engine remain online and accessible for queries and/or reports by maintaining copies of the tables for failover support on the remaining engines. However, when two or more engines go down within a single cluster, the system is taken down because access to the data of the tables cannot be guaranteed.

To reduce availability issues, a conventional approach has been to limit the size of the cluster to just two engines. This also improved performance because when any data is manipulated on a primary engine, the data has to be reflected on the fallback engine. When more than 2 engines are in a cluster, the primary engine buffers data based on destination to the fallback engine. So, when there are more than 2 engines in a cluster, the fallback engine receives data from multiple buffers from different primary engines within that cluster, and the fallback engine has to switch between them. This causes significant Central Processing Unit (CPU) overhead on the sender side (primary engine) and Input/Output (I/O) overhead on the receiving engine (fallback engine).

However, wherein there are just two engines this forces re-clustering of the system for system expansion situations. For instance, when a single node clique (shared resource) is added to the system, the engines in the new clique cannot form a cluster by themselves because it causes down time when the clique goes down.

Therefore, there is a need for improved fallback processing within a distributed data warehouse that is not restricted to just two processing engines in a single cluster.

SUMMARY

Methods and a system for dedicated fallback processing within a distributed data warehouse are presented.

In an embodiment, a method for dedicated fallback processing within a distributed data warehouse is provided. A first processing unit within a single cluster is configured to process as a first dedicated fallback processing unit for a second processing unit of the single cluster. The second processing unit is configured as a second dedicated fallback processing unit for a third processing unit of the single cluster. The third processing unit is configured as a third dedicated fallback processing unit for the first processing unit.

DETAILED DESCRIPTION

Various embodiments depicted herein are implemented as one or more software modules, which are programmed within memory and/or non-transitory computer-readable storage media and executed on one or more processing devices (having memory, storage, network connections, one or more processors, etc.).

As used herein, the terms and phrases "database," and "data warehouse" may be used interchangeably and synonymously. That is, a data warehouse may be viewed as a collection of databases or a collection of data from diverse and different data sources that provides a centralized access and federated view of the data from the different data sources through the data warehouse (may be referred to as just "warehouse").

As used herein a "processing unit" is a distributed database engine that executes instructions on a network node device of the processing unit. Multiple distributed processing units are provided for executing database instructions in parallel over a network. The phrase "processing unit" may be used interchangeable and synonymously with the phrase "Access Module Processor (AMP)."

A novel dedicated fallback processing technique is provided that includes configuring each AMP of a single cluster, such that each AMP is both a primary AMP and a fallback AMP to only one other AMP of the cluster, rather than all the other AMPs in the cluster.

It is to be noted that as discussed here usage of the term "table" includes portions or a portion of a single table.

Figure 1A:
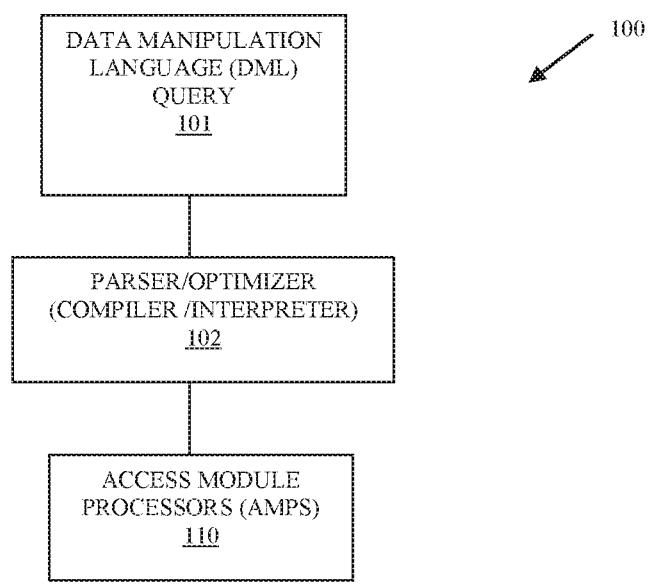
FIG. 1A is a diagram of a system for a distributed data warehouse, according to an embodiment.

FIG. 1A is a diagram of a system 100 for a distributed data warehouse, according to an embodiment.

The system 100 is shown in greatly simplified form with just those components necessary for comprehension of embodiments of the invention presented. It is to be understood that additional components or subcomponents may be used without departing from the teachings presented herein.

The system 100 includes a Data Manipulation Language (DML) (such as Structured Query Language (SQL)) query 101 (herein after just "query 101," a parser/optimizer (compiler/interpreter) 102 (herein after just "optimizer 102"), and AMPs 110—that execute instructions against the database—the processing units or database engines).

The query 101 can be issued and/or originate from an automated process (application or script) within the warehouse/database (such as through schedule reports, etc.) or can be issued and/or originate from an end-user (such as a Database Administrator (DBA) or Data Analyst) through a user-interface to the warehouse/database.

The optimizer 102 translates or interrupts the query 101 into a set of optimal instructions that the AMPs 110 process against the warehouse. A query execution plan is produced by the optimizer 102.

The optimizer 102 provides the instructions to the AMPs 110, each AMP 110 process instructions against tables that are assigned to that AMP 110.

Figure 1B:
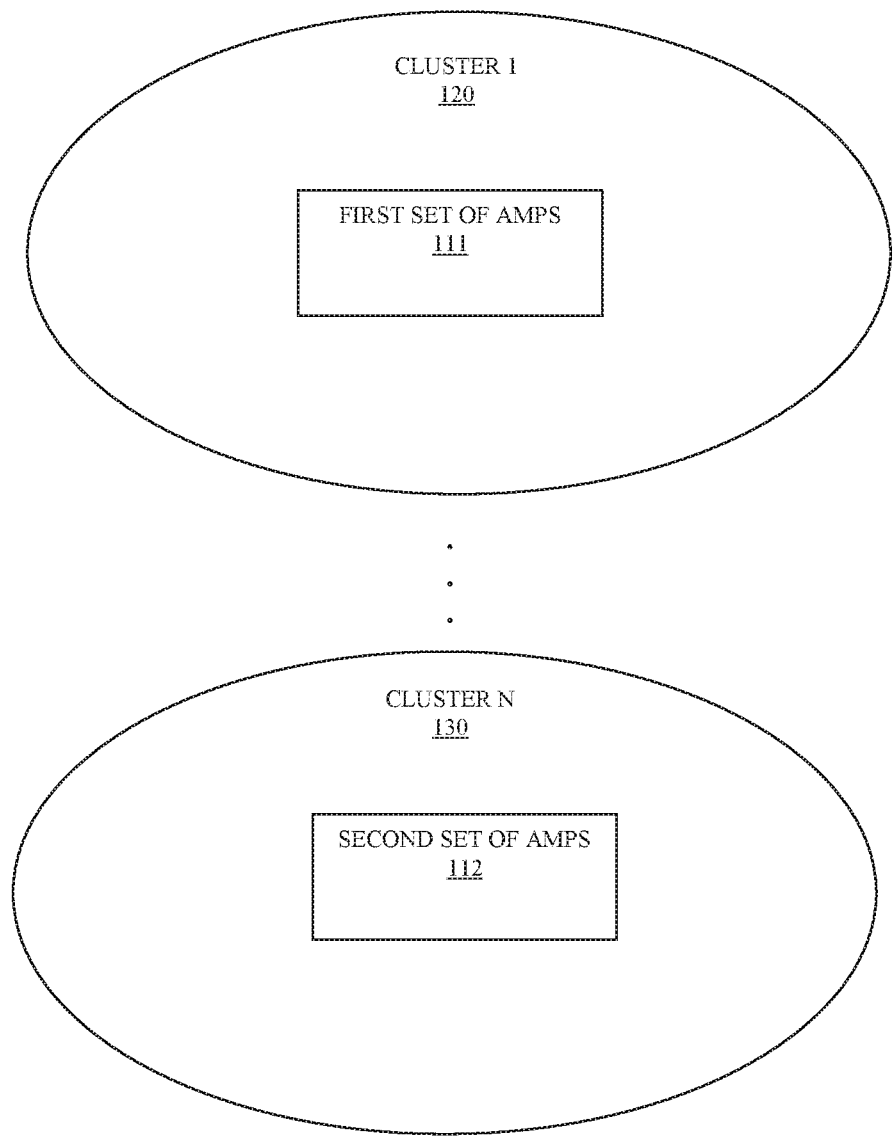
FIG. 1B is a diagram illustrating clusters of Access Module Processors (AMPs) within the distributed data warehouse, according to an example embodiment.

FIG. 1B is a diagram illustrating clusters of the AMPs 110 within the distributed data warehouse, according to an example embodiment.

There can be a plurality of clusters, such as a first cluster 120, a number of intermediate clusters, and a last cluster N 130. The first cluster 120 includes a first set of AMPS 121 and the last cluster includes a last set of AMPs N 131.

Figure 1C:
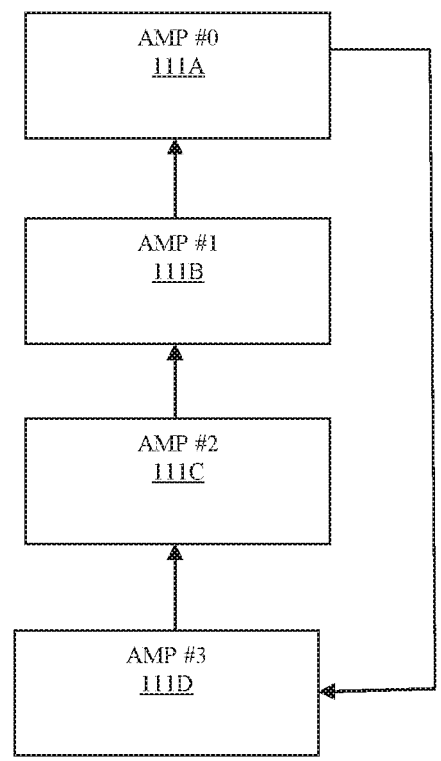
FIG. 1C is a diagram illustrating dedicated fallback processing for a single cluster, according to an example embodiment.

FIG. 1C is a diagram illustrating dedicated fallback processing for a single cluster, according to an example embodiment.

The first cluster 120 includes as the first set of AMPs 121, 4 AMP #0 121A, AMP #1 121B, AMP#3 121C, and AMP#4 121D.

The processing comprising a dedicated fallback algorithm that configures each AMP 121A-121D to be a dedicated fallback to one other AMP of the cluster 120. Each AMP 121A-121D is also configured to be a primary AMP. So, AMP #0 121A is a primary AMP that is configured to process against its primary assigned tables, and AMP #1 121B is also configured to handle tables assigned to AMP #1 121B when AMP#0 121A fails (AMP #1 121B is a dedicated fallback AMP to AMP #0 121A). Similarly, AMP #2 121C is a dedicated fallback AMP to AMP #1 121B; AMP #3 121D is a dedicated fallback AMP to AMP #2 121C; and AMP #0 121A is a dedicated fallback AMP to AMP #3 121D.

The dedicated fallback algorithm avoids spreading failover data from tables of an AMP across all the AMPs of the cluster. Each AMP has a single dedicated fallback AMP within the cluster and each AMP is also a primary AMP for its assigned tables within the cluster. At the same time, the dedicated fallback algorithm achieves the same performance or improved performance as a cluster of just two AMPs utilizing more than two AMPs.

This also increases table availability within the distributed data warehouse over legacy fallback approaches because the tables can be kept online as long as a dedicated primary AMP and its dedicated fallback AMP are online.

It is to be noted that the dedicated fallback algorithm works with a cluster having an even number of AMPs and with clusters having an odd number of AMPs.

In an embodiment, at least one cluster of the distributed data warehouse includes more than two AMPs, such that when two AMPs are down the distributed data warehouse 100 is still operational, which is not the case with convention techniques. For example, when AMP #0 121A is down and AMP#2 121C is down, AMP #1 121B takes over for AMP #0 121A and AMP #3 121D takes over for AMP #2 121C.

These and other embodiments are now discussed with reference to the FIGS. 2-4.

Figure 2:
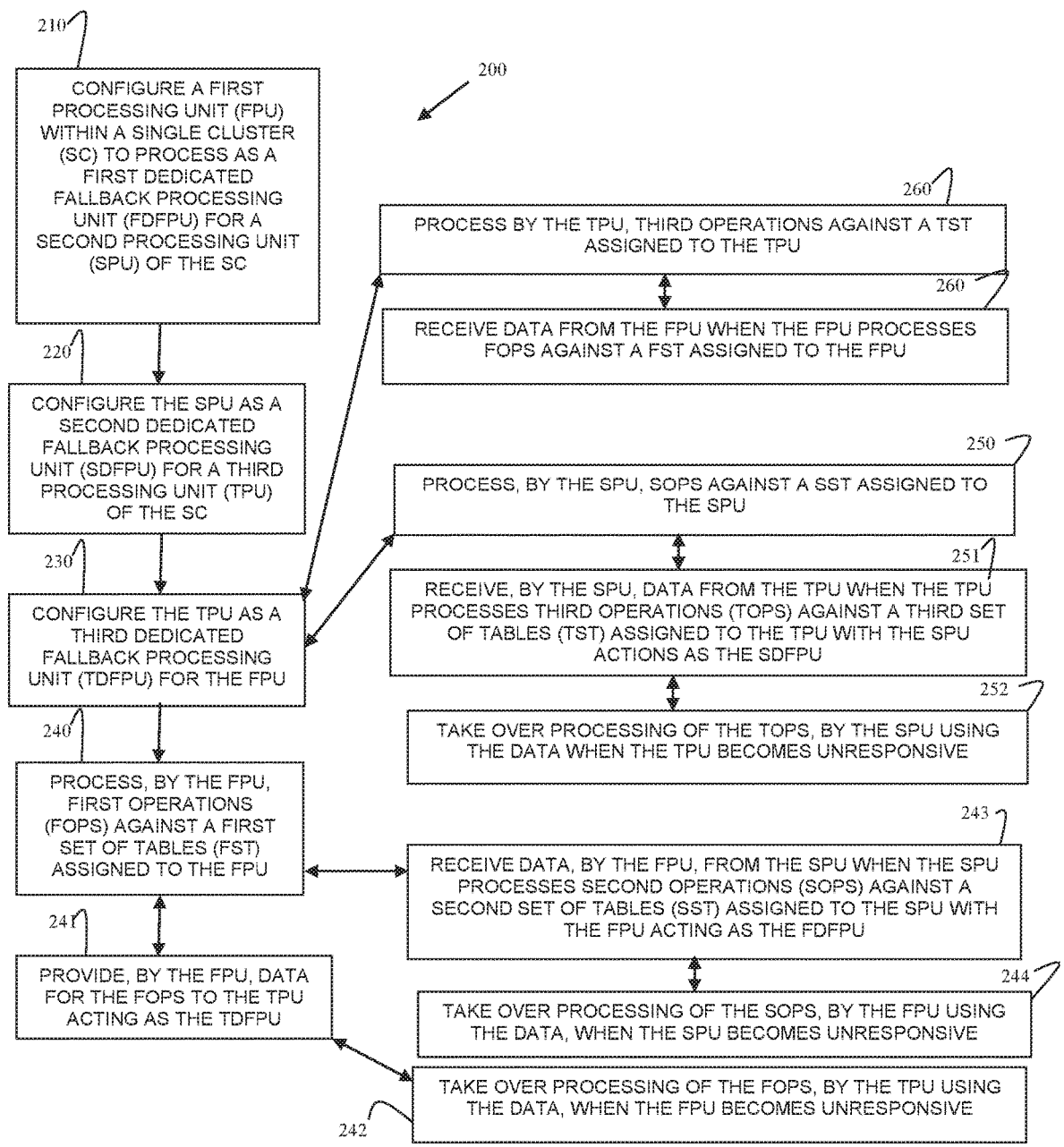
FIG. 2 is a diagram of a method for dedicated fallback processing within a distributed data warehouse, according to an example embodiment.

FIG. 2 is a diagram of a method 200 for dedicated fallback processing within a distributed data warehouse, according to an example embodiment. The method 200 is implemented as one or more software modules referred to as a "fallback configuration manager"). The fallback configuration manager is executable instructions that are programmed within memory or a non-transitory computer-readable medium and executed by one or more hardware processors. The fallback configuration manager has access to one or more network connections during processing, which can be wired, wireless, or a combination of wired and wireless.

In an embodiment, the fallback configuration manager is implemented within a data warehouse across one or more physical devices or nodes (computing devices) for execution over a network connection.

In an embodiment, the fallback configuration manager is the dedicated fallback algorithm and processing discussed above with the FIG. 1C.

At 210, the fallback configuration manager configures a first processing unit within a single cluster to process as a dedicated fallback processing unit for a second processing unit of the single cluster.

A "processing unit" is an AMP 110.

At 220, the fallback configuration manager configures the second processing unit as a second dedicated processing unit for a third processing unit of the single cluster.

At 230, the fallback configuration manager configures the third processing unit as a third dedicated fallback processing unit for the first processing unit.

According to an embodiment, at 240, the first processing unit processes first operations against a first set of tables assigned to the first processing unit.

In an embodiment of 240 and at 241, the first processing unit provides data for the first operations to the third processing unit acting as the third dedicated fallback processing unit.

In an embodiment of 241 and at 242, the third processing unit takes over processing of the first operations using the data when the first processing unit becomes unresponsive.

In an embodiment of 240 and at 243, the first processing unit receives data from the second processing unit when the second processing unit processes second operations against a second set of tables assigned to the second processing unit with the first processing unit acting as the first dedicated fallback processing unit.

In an embodiment, at 250, the second processing unit processes second operations against a second set of table assigned to the second processing unit.

In an embodiment of 250 and at 251, the second processing unit receives data from the third processing unit when the third processing unit processes third operations against a third set of tables assigned to the third processing unit with the second processing unit acting as the second dedicated fallback processing unit.

In an embodiment of 251 and at 252, the second processing unit takes over processing of the third operations using the data when the third processing unit becomes unresponsive.

In an embodiment, at 260, the third processing unit processes third operations against a third set of tables assigned to the third processing unit.

In an embodiment of 260 and at 261, the third processing unit receives data from the first processing unit when the first processing first operations against a first set of tables assigned to the first processing unit.

Figure 3:
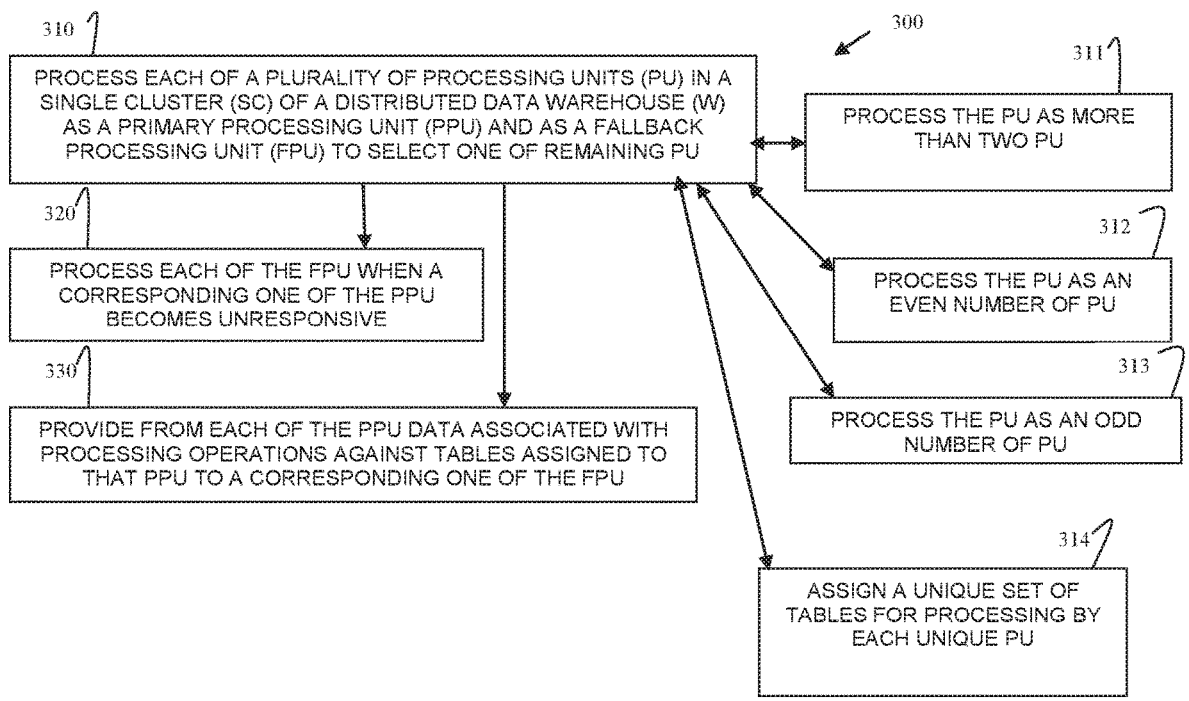
FIG. 3 is a diagram of another method for dedicated fallback processing within a distributed data warehouse, according to an example embodiment.

FIG. 3 is a diagram of another method 300 for dedicated fallback processing within a distributed data warehouse, according to an example embodiment. The method 300 is implemented as one or more software modules referred to as a "cluster fallback configuration manager." The cluster fallback configuration manager is executable instructions that are programmed within memory or a non-transitory computer-readable medium and executed by one or more hardware processors. The cluster fallback configuration manager has access to one or more network connections during processing, which can be wired, wireless, or a combination of wired and wireless.

The cluster fallback configuration manager presents another and in some ways enhanced perspective of the processing discussed above with the FIGS. 1A-1C and 2.

In an embodiment, the cluster fallback configuration manager is all or some combination of: the dedicated fallback algorithm of the FIG. 1C and/or the method 200.

At 310, the cluster fallback configuration manager processes each of a plurality of processing units in a single cluster of a distributed data warehouse as a primary processing unit and as a fallback processing unit to a select one of the remaining processing units.

In an embodiment, at 311, the cluster fallback configuration manager processes the processing units as more than two processing units.

In an embodiment, at 312, the cluster fallback configuration manager processes the processing units as an even number of processing units.

In an embodiment, at 313, the cluster fallback configuration manager processes the processing units as an odd number of processing units.

In an embodiment, at 314, the cluster fallback configuration manager assigns a unique set of table for processing by each unique processing unit.

According to an embodiment, at 320, the cluster fallback configuration manager processes each of the fallback processing units when a corresponding one of the primary processing units becomes unresponsive.

In an embodiment, at 330, the cluster fallback configuration manager provides from each of the primary processing units data associated with processing operations against tables assigned to the primary processing units to a corresponding one of the fallback processing units.

Figure 4:
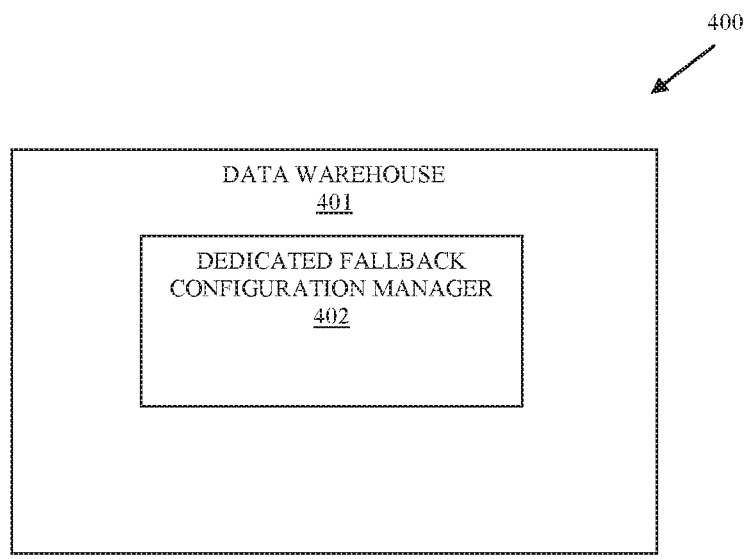
FIG. 4 is a diagram of a system dedicated fallback processing within a distributed data warehouse, according to an example embodiment.

FIG. 4 is a diagram of another system 400 for dedicated fallback processing within a distributed data warehouse, according to an embodiment. The system 400 includes a variety of hardware components and software components. The software components are programmed as executable instructions into memory or a non-transitory computer-readable medium for execution on the hardware components.

The system 400 implements, inter alia, the processing discussed above with the FIGS. 1A-1C and 2-3.

The system 400 includes a data warehouse 401. The data warehouse 401 includes a dedicated fallback configuration manager 402.

The dedicated fallback configuration manager 402 is configured to: 1) execute on at least one hardware processor of a network computing device, and 2) configure and process each of a plurality of processing units within a single cluster of the data warehouse 401 as a primary processing unit and as a dedicated fallback processing unit for a unique one of remaining ones of the processing units.

In an embodiment, a total number of processing units is greater than two and the total number is one of: an even number and an odd number.

In an embodiment, the dedicated fallback configuration manager 402 is all or some combination of: the dedicated fallback algorithm of the FIG. 1C, the method 200, and/or the method 300.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method for dedicated fallback processing within a distributed data warehouse, said distributed data warehouse including a plurality of processing units arranged in a plurality of clusters, said method comprising:
   configuring first, second, and third processing units within a single cluster;
   configuring the first processing unit within the single cluster to process as a first dedicated fallback processing unit for the second processing unit of the single cluster;
   configuring the second processing unit as a second dedicated fallback processing unit for the third processing unit of the single cluster; and
   configuring the third processing unit as a third dedicated fallback processing unit for the first processing unit.

2. The method of claim 1 further comprising, processing, by the first processing unit, first operations against a first set of tables assigned to the first processing unit.

3. The method of claim 2, wherein processing further includes providing, by the first processing unit, data for the first operations to the third processing unit acting as the third dedicated fallback processing unit.

4. The method of claim 3, wherein providing further includes taking over processing of the first operations, by the third processing unit using the data, when the first processing unit becomes unresponsive.

5. The method of claim 2, wherein processing further includes receiving data, by the first processing unit, from the second processing unit when the second processing unit processes second operations against a second set of tables assigned to the second processing unit with the first processing unit actions as the first dedicated fallback processing unit.

6. The method of claim 5, wherein receiving further includes taking over processing of the second operations, by the first processing unit using the data, when the second processing unit becomes unresponsive.

7. The method of claim 1, further comprising, processing, by the second processing unit, second operations against a second set of tables assigned to the second processing unit.

8. The method of claim 7, wherein processing further includes receiving, by the second processing unit, data from the third processing unit when the third processing unit processes third operations against a third set of tables assigned to the third processing unit.

9. The method of claim 8, wherein receiving further includes taking over processing of the third operations, by the second processing unit using the data when the third processing unit becomes unresponsive.

10. The method of claim 1 further comprising, processing by the third processing unit, third operations against a third set of tables assigned to the third processing unit.

11. The method of claim 10, wherein processing further includes receiving data from the first processing unit when the first processing unit processes first operations against a first set of tables assigned to the first processing unit.

12. A method for dedicated fallback processing within a distributed data warehouse, said distributed data warehouse including a plurality of processing units arranged in a plurality of clusters, said method comprising:
   configuring a sub-plurality of processing units within a single cluster;
   processing each one of the processing units within the sub-plurality of processing units in the single cluster of the distributed data warehouse as a primary processing unit and as a fallback processing unit to a select one of remaining processing units within the sub-plurality of processing units within the single cluster.

13. The method of claim 12 further comprising, processing each of the fallback processing units when a corresponding one of the primary processing units becomes unresponsive.

14. The method of claim 12 further comprising, providing from each of the primary processing units data associated with processing operations against tables assigned to that primary processing unit to a corresponding one of the fallback processing units.

15. The method of claim 12, wherein the sub-plurality of processing units comprises more than two processing units.

16. The method of claim 12, wherein processing further includes processing the plurality of processing units as an even number of processing units.

17. The method of claim 12, wherein processing further includes processing the plurality of processing units as an odd number of processing units.

18. The method of claim 12, wherein processing further includes assigning a unique set of tables for processing by each unique processing unit.

19. A system, comprising:
a distributed data warehouse including:
    a plurality of processing units arranged in a plurality of clusters;
    a sub-plurality of processing units within a single cluster;
    a dedicated fallback configuration manager;
    wherein the dedicated fallback configuration manager is configured to: i) execute on at least one network node of the data warehouse ii) configure and process each one of the processing units within the sub-plurality of processing units within the single cluster of the data warehouse as a primary processing unit and as a dedicated fallback processing unit for a unique one of remaining ones of the processing units within the sub-plurality of processing units within the single cluster.

20. The system of claim 19. wherein a total number of processing units within the sub-plurality of processing units within the single cluster is greater than two and the total number is one of: an even number and an odd number.

* * * * *